United States Patent [19]

Von Wichert et al.

[11] Patent Number: 4,814,072

[45] Date of Patent: Mar. 21, 1989

[54] METHOD OF AND APPARATUS FOR REPLACING DEFECTIVE PACKETS IN A STREAM OF RANDOMLY DISTRIBUTED SATISFACTORY AND DEFECTIVE PACKETS

[75] Inventors: Nils Von Wichert, Glinde; Michael Knabe, Reinbek; Dieter Schwenke, Hamburg, all of Fed. Rep. of Germany

[73] Assignee: Körber AG, Hamburg, Fed. Rep. of Germany

[21] Appl. No.: 52,832

[22] Filed: May 20, 1987

[30] Foreign Application Priority Data

May 30, 1986 [DE] Fed. Rep. of Germany ....... 3618247

[51] Int. Cl.$^4$ .......................... B07C 5/00; B65G 47/86
[52] U.S. Cl. ......................................... 209/535; 53/53; 198/347; 209/936; 414/222; 414/788.4; 414/934
[58] Field of Search ................. 209/535–537, 209/539, 552, 651, 653, 698, 916, 936; 198/347, 346.2, 780, 781, 404; 414/222, 225, 41, 32; 53/53, 54

[56] References Cited

U.S. PATENT DOCUMENTS

| | | | |
|---|---|---|---|
| 2,836,281 | 5/1958 | Cookson | 198/404 |
| 2,896,647 | 7/1959 | Thomson | 198/404 X |
| 3,517,477 | 6/1970 | Thomton | 53/53 |
| 3,762,130 | 10/1973 | Davies et al. | 53/53 X |
| 3,814,232 | 6/1974 | Eriksson | 198/740 X |
| 3,956,110 | 5/1976 | Seragnoli | 209/535 X |
| 4,243,135 | 1/1981 | Heitmann | 198/370 |
| 4,475,643 | 10/1984 | Klingenberg | 198/347 |
| 4,586,612 | 5/1986 | Oberg | 209/643 X |
| 4,643,027 | 2/1987 | Deutsch et al. | 53/53 X |

FOREIGN PATENT DOCUMENTS 2150520 11/1983 United Kingdom .

Primary Examiner—Johnny D. Cherry
Assistant Examiner—Donald T. Hajec
Attorney, Agent, or Firm—Peter K. Kontler

[57] ABSTRACT

A stream of neighboring stacks of superimposed cigarette packs wherein the stacks can consist of or contain defective packs is advanced intermittently along a horizontal path. Stacks which contain or consist of defective packs are removed by the pockets of an indexible turret which is located in a vertical plane extending at right angles to the path of the stream. The defective pack or packs of a removed stack are expelled from the respective pocket in a first angular position of the pocket in which the latter is remote from the path for the stream, and the partially or completely emptied pocket is then indexed to a second position to receive one or more satisfactory packs which were expelled from previously removed stacks of defective and satisfactory packs before the thus filled pocket is returned into the path for the stream to fill a gap which has developed as a result of removal of a stack. A suction cup is provided to temporarily hold a removed satisfactory pack preparatory to introduction into a pocket which is about to return into the path for the stream of stacks.

38 Claims, 7 Drawing Sheets

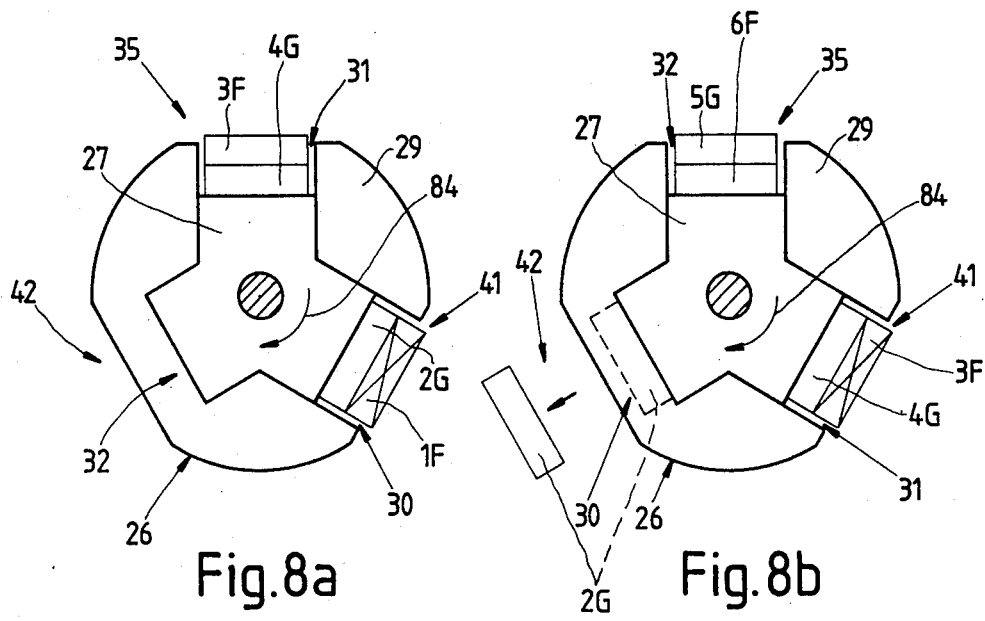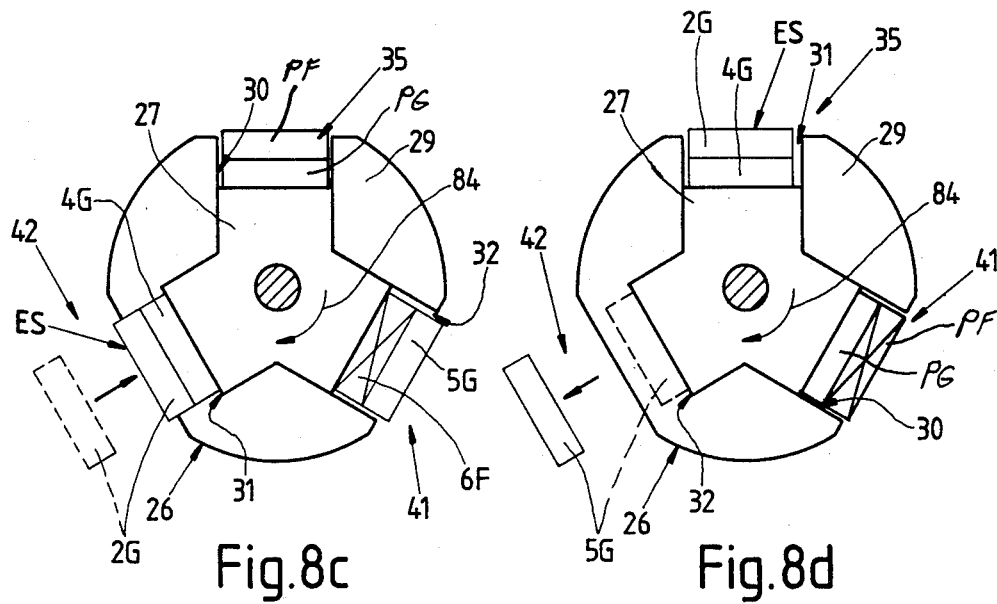

METHOD OF AND APPARATUS FOR REPLACING DEFECTIVE PACKETS IN A STREAM OF RANDOMLY DISTRIBUTED SATISFACTORY AND DEFECTIVE PACKETS

BACKGROUND OF THE INVENTION

The invention relates to a method of and to an apparatus for manipulating block-shaped objects, such as packs of cigarettes, cigarillos, cigars and other rod-shaped smokers' products. A similar apparatus is disclosed in commonly owned U.S. Pat. No. 4,243,135. More particulary, the invention relates to improvements in a method of and in an apparatus for replacing defective objects in a stream of objects wherein satisfactory and defective objects are distributed in random fashion. Still more particularly, the invention relates to improvements in a method of and in an apparatus for replacing defective objects in a stream wherein defective and satisfactory objects form a series of neighboring stacks of overlapping satisfactory, defective and/or satisfactory and defective objects.

It is well known to directly couple two machines in a production line which turns out cartons or bundles of packs of cigarettes, cigarillos or cigars (hereinafter referred to as cigarette packs). For example, it is known to directly couple a machine which provides cigarette packs with outer envelopes of transparent or translucent material (called wrapper machine) with a case packer or with a carton packing machine. The path between the two machines normally extends along a mechanism which is used to remove defective packs so as to ensure that the case packer or the carton filler receives only satisfactory packs, namely packs whose outer envelopes are acceptable in each and every respect. This involves a monitoring of the packs ahead of the ejecting station and the generation of signals which are used to initiate the ejection of corresponding packs from their path in order to ensure that the defective packs (e.g., those having projecting portions of outer envelopes, those without outer envelopes and/or those having soiled or otherwise unacceptable outer envelopes) cannot reach the case packer or the carton filling machine.

The case packer or the carton filling machine operates properly only if it receives stacks of satisfactory packs. This necessitates expulsion of all stacks which consist exclusively of defective packs as well as completion of all stacks which contain defective and satisfactory packs by replacing each defective pack with a satisfactory pack. Gaps which develop in the stream of stacks advancing toward the case packer or toward the carton filling machine as a result of expulsion of one or more complete stacks by advancing the trailing (satisfactory) stacks with reference to the preceding (satisfactory) stacks. The completion of stacks which contained satisfactory and defective packs and from which defective packs were expelled presents greater problems because it is necessary to insert a satisfactory pack in lieu of each expelled defective pack.

Proposals to solve the above problem include the expulsion of each stack which consists exclusively of defective packs as well as to expel each stack which contains one or more satisfactory and one or more defective packs. Such proposals failed to gain acceptance in the industry because the number of expelled packs is excessive.

Another proposal is disclosed in the published British patent application Ser. No. 2 150 520 A of Boyce who proposes to expell all stacks which contain one or more defective packs and to replace the expelled stacks with spare stacks consisting of satisfactory packs which were recovered from expelled stacks with satisfactory and defective packs. Spare stacks are obtained from a pile which consists of receovered satisfactory packs and is gathered by hand. Such proposal is not entirely satisfactory because it involves manual work and cannot ensure the refilling of gaps in an automated production line which must turn out large numbers of smokers' articles, e.g., up to and in excess of 400 packs per minute.

OBJECTS AND SUMMARY OF THE INVENTION

An object of the invention is to provide a novel and improved method of refilling a stream of block-shaped objects, paticularly cigarette packs, in a fully automatic way and at the rate which is required in an automated production line.

Another object of the invention is to provide a method which renders it possible to reintroduce expelled satisfactory packs into a multilayer stream of packs as soon as a gap develops upon completed expulsion of unsatifactory packs.

A further object of the invention is to provide a method which ensures that all satisfactory packs are treated gently, in a small area, and without any assistance from attendants.

An additional object of the invention is to provide a novel and improved method of accumulating expelled satisfactory objects into spare stacks which are ready for reintroduction into the multi-layer stream of objects.

Still another object of the invention is to provide a novel and improved apparatus for the practice of the above outlined method and to provide the apparatus with novel and improved means for automatically removing from the stream of stacks of superimposed objects any and all stacks which contain or consist of defective objects.

A further object of the invention is to provide the apparatus with novel and improved means for classifying the removed objects according to their condition and with novel and improved means for gathering or accumulating satisfactory objects into stacks which are ready for reintroduction into the stream.

Still another object of the invention is to provide the apparatus with novel and improved means for transporting the stream of stacks of superimposed objects and with novel and improved means for conveying stacks which contain or consist of defective objects.

Another object of the invention is to provide a novel and improved apparatus for manipulating cigarette packs between a wrapper machine and a carton filler or a case packer.

An additional object of the invention is to provide a production line which embodies the above outlined apparatus.

One features of the present invention resides in the provision of a method of replacing defective objects, such as packs of cigarettes, cigars or cigarillos, with satisfactory objects in a multi-layer stream of neighboring stacks of overlapping objects. The method comprises the steps of removing from the stream each stack which consists of defective objects or contains defective and satisfactory objects whereby the removal of stacks results in the development of gaps in the stream, accumulating the removed satisfactory objects into spare stacks, and returning the objects which constitute spare stacks into the stream so as to fill at least some of the gaps. The accumulating step preferably includes mechanically (automatically) gathering satisfactory objects into spare stacks.

The method further comprises the step of segregating defective objects from satisfactory objects of the removed stacks which contain satisfactory and defective objects. The segregating step preferably includes expelling defective objects from stacks which contain satisfactory and defective objects.

The accumulating step preferably includes piling or placing removed satisfactory objects on top of each other until the thus obtained pile constitutes a spare stack.

The method can further comprise the step of temporarily storing at least some satisfactory objects which are removed from the stream.

In accordance with a presently preferred embodiment, each stack comprises two overlapping, particularly superimposed, objects.

The method preferably further comprises the step of transporting or advancing the stream along an elongated substantially straight path, and the removing step of such method preferably comprises moving the stacks which contain or consist of defective objects from a predetermined portion of the path substantially at right angles to the predetermined path. The path is or can be substantially horizontal, and the removing step then includes advancing each removed stack in a substantially vertical plane. The accumulating step can include gathering the removed satisfactory objects in a predetermined portion of the plane and the returning step of such method preferably includes moving the gathered satisfactory objects from the predetermined portion of the plane back into the predetermined portion of the path.

The method can further comprise the steps of monitoring the objects of successive stacks of the stream ahead of the path, e.g., even before the objects form a stream, generating signals which denote the detection of defective objects, and utilizing such signals for removal of stacks which contain defective objects from the predetermined portion of the path.

Another feature of the invention resides in the provision of an apparatus for replacing defective objects in a multi-layer stream of neighboring stacks of overlapping objects (such as cigarette packs) wherein randomly distributed stacks contain satisfactory and/or defective objects. The apparatus comprises means for transporting the stream of neighboring stacks along a predetermined path, and conveyor means including means for removing stacks containing or consisting of defective objects from the path with the resulting development of gaps in the stream, and for admitting into the path spare stacks including satisfactory objects of removed stacks containing satisfactory and defective objects. The conveyor means preferably further includes or cooperates with means for gathering removed satisfactory objects into spare stacks. Such gathering means preferably includes or cooperates with means for mechanically (automatically) accumulating removed satisfactory objects into spare stacks.

The transporting means includes means for advancing the stream in a predetermined direction, and the conveyor means includes a conveyor which is rotatable about a predetermined axis in a plane extending substantially at right angles to the direction of advancement of the stream. The conveyor means further comprises means for rotating the conveyor in such plane.

The removing-admitting means preferably includes pockets in the conveyor, and each such pocket is designed to receive a stack containing at least one defective object or a spare stack of satisfactory objects. The rotating means preferably comprises means for indexing the conveyor about the predetermined axis between a plurality of positons in each of which a different pocket is located in a predetermined portion of the path. The pocket which is located in the predetermined portion of the path can be said to form part of the transporting means.

The apparatus preferably further comprises means for expelling defective objects from a first pocket of the indexible conveyor while a second pocket of the conveyor is located in the predetermined portion of the path, and means for temporarily storing satisfactory objects for admission into one pocket while another pocket of the conveyor is located in the predetermined portion of the path.

The conveyor preferably comprises more than two pockets, and the expelling means is preferably arranged to expel defective objects from a first pocket while a second pocket is located in the predetermined portion of the path and while a third pockets is located in the range of the means for temporarily storing satisfactory objects for admission into such third pocket. In accordance with a presently preferred embodiment, the conveyor comprises three equidistant pockets and the indexing means includes means for indexing the conveyor through angles of 120°. The conveyor is indexible along a second path (in the aforementioned plane) and the expelling means is adjacent a predetermined portion of such second path. The storing means is adjacent another portion of the second path and preferably includes holder means for removing satisfactory objects from and for introducing satisfactory objects into the adjacent pocket of the conveyor. Each pocket can be dimensioned to accommodate two overlapping objects.

Each pocket preferably comprises a first and a second wall as well as a chamber for a stack of objects between such walls. At least one of the walls is or can be elastic and is movable toward and away from the other wall to respectively engage and release an object or a stack in the respective chamber. At least one of the walls can be provided with a projection which serves to overlie an object in the respective chamber while the one wall engages an object or a stack in the chamber.

The conveyor can include a rotor which is indexible about the predetermined axis, and the apparatus can further comprise two sidewalls which flank the rotor. The sidewalls have first openings which are located in the path for the stream so that successive stacks of the stream can enter and leave the predetermined portion of such path by entering the predetermined portion by way of one of the first openings and by leaving the predetermined portion by way of the other first opening. At least one of the sidewalls is further formed with at least one second opening in register with the pocket which is adjacent the expelling means. The expelling means can comprise first and second pushers which are disposed at opposite sides of the conveyor and means for moving the pushers through the second opening of the corresponding sidewall to expel the defective object or objects from the stack in the adjacent pocket. The means for moving the pushers preferably includes first and second pivotable levers which are operatively connected with the respective pushers, and means for pivoting the levers. The pivoting means can comprise first and second motors (e.g., double-acting cylinder and piston units) each having a reciprocable output element (e.g., a piston rod) which is arranged to perform a forward and a return stroke, and first and second transmissions interposed between the output elements of the first and second motors and the respective levers. Each transmission is preferably provided with means for converting one stroke of the respective output element into clockwise and counterclockwise pivotal movements of the respective lever to thus advance the corresponding pusher into as well as to extract such pusher from the adjacent pocket.

The aforementioned holder means of the means for storing satisfactory objects preferably includes a suction-operated holder (e.g., a suction cup) for objects, and the apparatus further comprises means for moving the holder with reference to the conveyor. The means for moving the holder preferably comprises means for moving the one wall of the adjacent pocket away from the other wall so as to release the object or objects in the adjacent pocket for removal from the pocket or to permit insertion of one or more objects into the in the adjacent pocket for removal from the pocket or to permit insertion of one or more objects into the pocket. The means for moving the holder is designed to move the holder (particularly to reciprocate the holder) along a predetermined path, and the apparatus preferably further comprises guide means for objects. The guide means flanks the holder and ensures that an object which is attracted or otherwise held by the holder is moved along a predetermined path into or from the adjacent pocket. Such apparatus can further comprise means for selectively shortening the strokes of the holder in its path, preferably by a distance corresponding to the thickness of an object.

The means for transporting the stream can comprise pushers for the stacks and means for moving the pushers transversely of the path for the stream as well as in the longitudinal direction of such path. The means for moving the pushers of the transporting means can comprise an elongated bar or another suitable carrier for pushers and two planetary transmissions with eccentrics which support spaced-apart portions of the carrier. The pushers on the carrier preferably define a row of compartments for discrete stacks of objects.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIGS. 8a to 8d show the indexible conveyor in several angular positions with the position of FIG. 8a corresponding to that of FIG. 8d.

ESCRIPTION OF THE PREFERRED EMBODIMENTS

Figure 1:
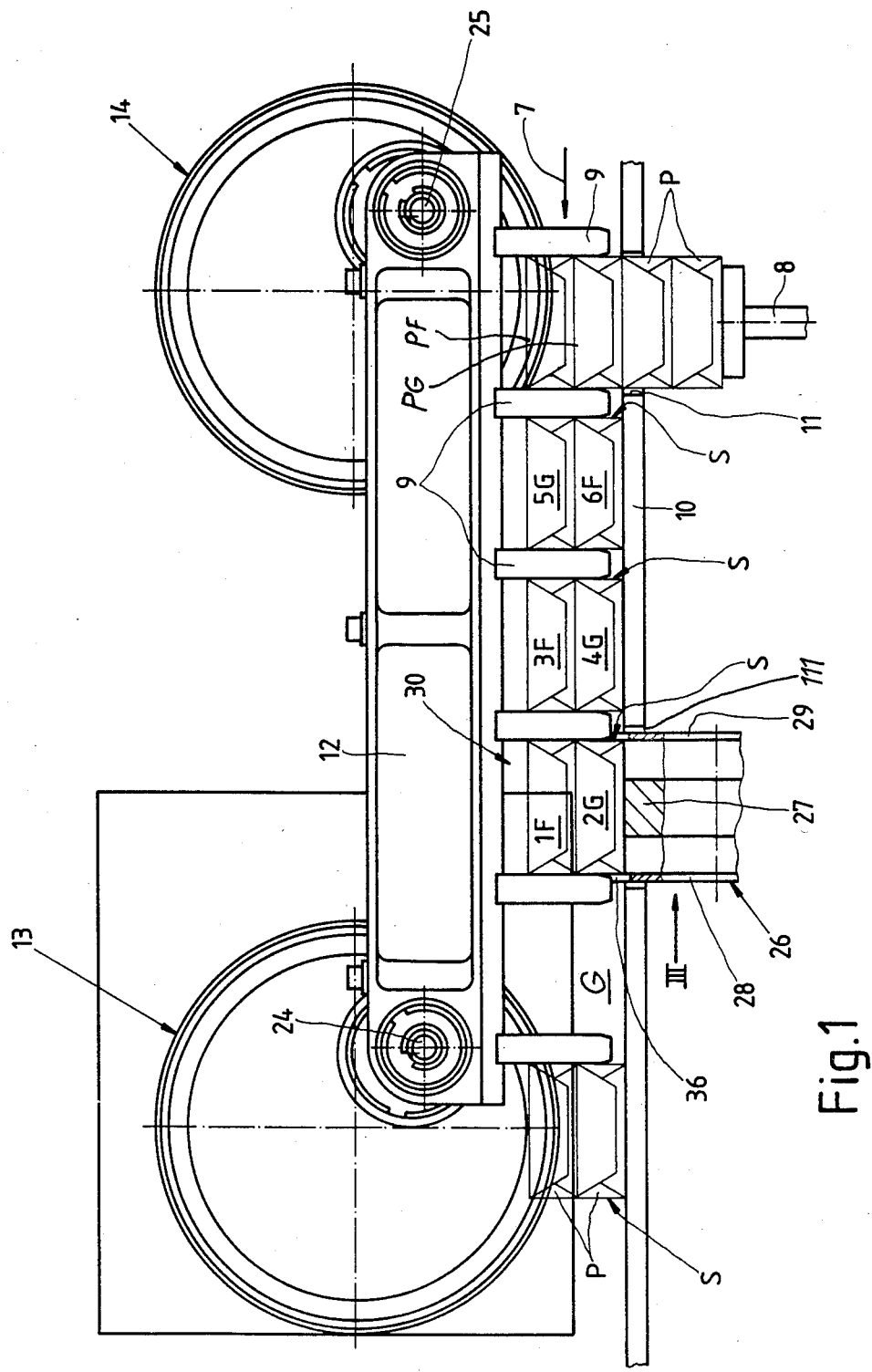
FIG. 1 is a front elevational view of an apparatus which embodies the invention, the indexible conveyor being shown in an axial sectional view and partly broken away.

FIG. 1 shows a stream of neighboring stacks S of superimposed objects in the form of cigarette packs P. This means for intermittently transporting the stream of stacks S along a horizontal path which is defined by the upper side of a staionary platform or table 10 includes a set of spaced-apart entraining elements or pushers 9 which depend from an elongated bar-like carrier 12, and means (including two identical planetary transmissions 13, 14) for moving the carrier 12 along an endless path in such a way that the pushers 9 perform first movements substantially transverely of the elongated path for the steam of stacks S or in the longitudinal direction of such path.

The stream includes randomly distributed stacks S containing only satisfactory packs (PG), satisfactory and defective packs (PG and PF), and only defective packs PF. The purpose of the appartatus is to remove from the horizontal path all those stacks S which contain or consist of defective packs PF so that the stream of stacks S on the platform 10 develops gaps G, and to fill at least some of these gaps with substitute stacks ES (FIGS. 8c and 8d) which consist of satisfactory packs PG. FIG. 1 shows that the stream of stacks S behind the gap G includes four successive stacks each of which includes a satisfactory pack and a defective pack. The first stack S behind the gap G consists of a defective pack 1F on top of a satisfactory pack 2G; the second stack S behind the gap G consists of a satisafctory pack 4G and a defective pack 3F on top of the pack 4G; the third stack S behind the gap G consists of a defective pack 6F and a satisfactory pack 5G on top of the pack 6F; and the fourth stack S behind the gap G consists of a satisfactory pack PG and a defective pack PF on top of the pack PG.

The packs P which are to form the stream of stacks S are supplied from a first processing machine, e.g., a machine which drapes each pack into a transparent or translucent outer layer of cellophane, polypropylene or other suitable wrapping material (known as wrapper machine), and stacks of satisfactory packs PG are delivered to a second processing machine (e.g., a case packer or a carton filler of known design).

The means for delivering pairs of superimposed packs PG, PF or PG+PF includes and elevator 8 which carries a supply of superimposed packs and is lifted stepwise to raise the two topmost packs above the level of the platform 10 so that such topmost packs can be advanced by the oncoming pusher 9 in the direction of arrow 7, i.e., to the left as seen in FIG. 1. The platform 10 has a suitable opening or window 11 for the packs on the elevator 8. The manner in which randomly distributed satisfactory packs PG and defecitve packs PF are delivered onto the elevator 8 forms no part of the present invention.

The mutual spacing of pushers 9 at the underside of the carrier 12 is such that neighboring pushers 9 define discrete compartments each of which can receive two superimposed packs P, i.e., a stack S which can consist of satisfactory packs, of defective packs or of one satisfactory and one defective pack.

Figure 2:
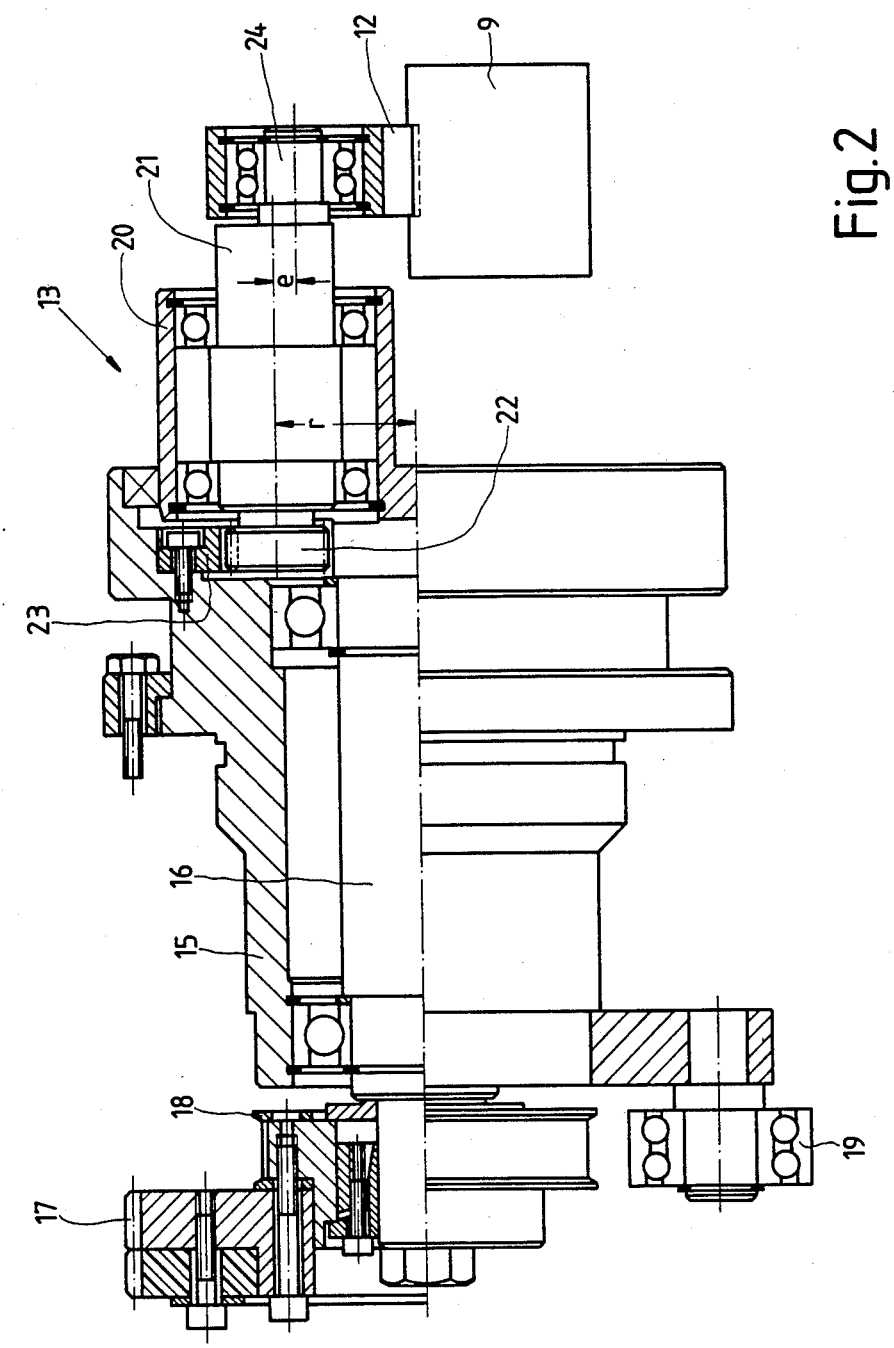
FIG. 2 is an enlarged partly elevational and partly axial sectional view of one of two planetary transmissions forming part of the means for transporting the stream of stacked objects along a horizontal path.
Figures 3, 7:
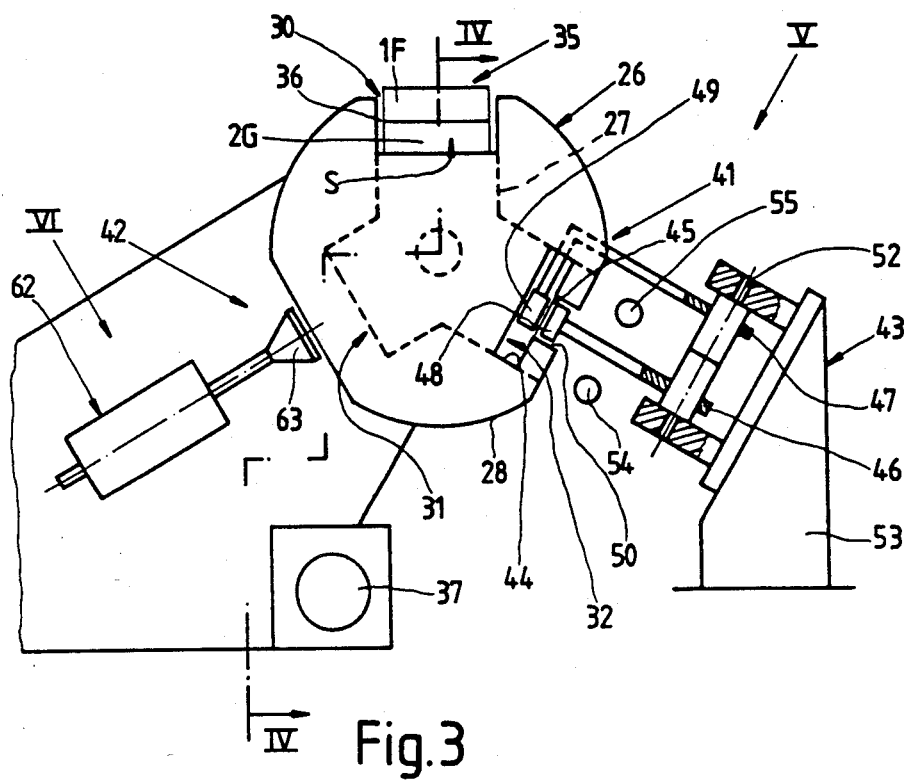
FIG. 3 is a smaller-scale elevational view of the indexible conveyor as seen in the direction of arrow III in FIG. 1, further showing the means for temporarily storing satisfactory objects and, in a sectional view, the means for expelling defective objects from the pockets of the indexible conveyor.
FIG. 7 is an enlarged partly elevational and partly sectional view as seen in the direction of arrows from the line VII—VII of FIG. 6.

The manner in which the carrier 12 is moved by the planetary transmissions 13, 14 in order to cause the pushers 9 to perform movements in or at right angles to the direction which is indicated by the arrow 7 will be explained with reference to FIG. 2 which shows the details of the planetary transmission 13. The latter is identical to and is driven in synchronism with the transmission 14. The transmission 13 comprises a housing 15 for a main drive shaft 16 of the left-hand end portion of which extends from the housing 15 and carries a driver gear 17 receiving motion from the main prime mover (not shown) of the apparatus or from the main prime mover of the production line including the improved apparatus. Such production line can include one or more cigarette makers, one or more filter rod makers, one or more filter tippping machines which unite plain cigarettes of unit length of multiple uint length with filter mouthpieces of unit length or multiple unit length to form filter cigarettes of unit length or multiple unit length, one or more packing machines which confine arrays of for example four, ten or twenty filter cigarettes in envelopes, and the aforementioned wrapper machine which provides each pack with a transparent or translucent outer wrapper of cellophane, polypropylene or the like. The exact manner in which defective packs PF are detected (e.g., in the wrapper machine) forms no part of the present invention. The defects can include improperly formed or bonded folds or tucks of the outer wrappers, the absence of outer wrappers and/or damage to outer wrappers. The means for monitoring the packs P for the presence or absence of defects can include an optoelectronic detector system of any known design which generates signals denoting the defective packs, and such signals are transported in imitation of advancement of packs from the monitoring station onto the platform 10 to be used for segregation of stacks S which contain defective packs PF or which consists of pairs of defective packs PF. Means for monitoring cigarette packs which are draped in a transparent or translucent plastic material are disclosed in numerous patents of the assignee of the present application including U.S. Pat. No. 4,643,027 to which reference may be had if necessary.

Referring again to FIG. 2, the driver gear 17 is advanced a toothed pulley 18 for an endless internally toothed belt (not shown) serving to drive a second toothed pulley on the main drive shaft of the planetary transmission 14 so as to ensure that the main drive shafts of the two transmissions are always rotated in exact synchronism, i.e., that the two end portions of the carrier 12 invariably perform identical movements in or counter to the direction of arrow 7 or ar right angles to such direction. The belt which is trained over the pulley 18 on the main drive shaft 16 of the planetary transmission 13 is tensioned by a roller 19 shown in the lower left-hand portion of FIG. 2.

The right-hand end portion of the main drive shaft 16 carries a casing 20 for bearings which surround a planet pinion shaft 21. The left-hand end portion of the shaft 21 extends into the housing 15 and carries a planet pinion 22 meshing with the teeth of an internal gear 23 which is installed in and cannot rotate relative to the housing 15. The pinion 22 rolls along the internal gear 23 in response to rotation of the main drive shaft 16, i.e., when the casing 20 and the planet pinion shaft 21 are caused to orbit about the axis of the main drive shaft 16. The right-hand end portion of the shaft 21 extends from the casing 20 and is provided with an eccentric stub 24 which is surrounded by antifriction bearings in the respective end portion of the carrier 12 for the pushers 9. FIG. 1 shows the eccentric stub 25 of the planet pinion shaft in the transmission 14; the stub 25 supports the other end portion of the carrier 12.

In the embodiments which is shown in the drawing, the ratio of the gears 23, 22 is four-to-one. The superimposition of the path of orbital movement of the axis of the planet pinion 22 upon the path of orbital movement of the center of the eccentric stub 24 results in the establishment of a substantially astroid path for the corresponding end portion of the carrier 12. The ratio of eccentricity r of the axis of the planetary pinion 22 to the axis of the main drive shaft 16 to eccentricity e of the axis of the stub 24 relative to the axis of the shaft 21 is 6.5 to one; such ratio of r to e ensures that the astroid closely resembles a square with slightly rounded corners. This, in turn, ensures that the pushers 9 on the carrier 12 move only or practically only at right angles to the plane of the upper side of the platform 10 or only or practically exclusively in or counter to the direction of arrow 7, i.e., in parallelism with the upper side of the platform 10.

Figure 4:
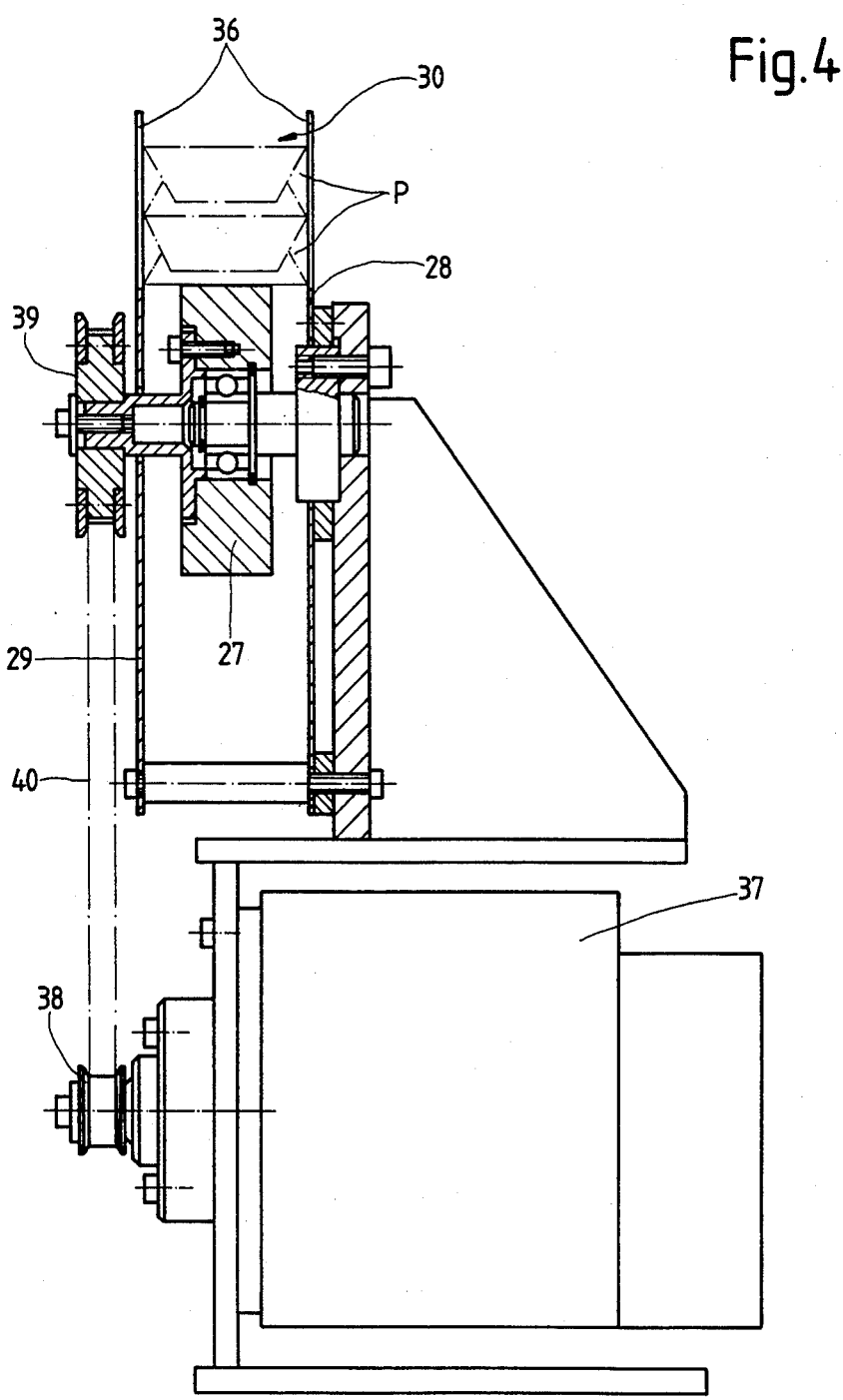
FIG. 4 is a greatly enlarged sectional veiw as seen in the direction of arrows from the line IV—IV of FIG. 3.

As can be seen in FIGS. 1, 3 and 8a to 8d, the means for removing defective stacks S (namely stacks which consists of or contain defective packs PF) includes conveyor means 26 having an indexible conveyor 27 in the form of a turret-shaped rotor between two stationary vertical sidewalls 28 and 29. The conveyor 27 is disposed in a vertical plane extending at right angles to the longitudinal direction of the path of movement of the stream of stacks S along the upper side of the platform 10. The latter has a second cutout 111 for portions of the sidewalls 28 and 29. These sidewalls have registering openings in the form of cutouts or recesses 36 each of which is large enough to allow for the passage of a stack S so that a stack of satisfactory and/or defective packs PG, PF can advance along the upper side of the platform 10 without any interference on the part of the sidewalls 28 and 29. The conveyor 27 is indexible through angles of 120° in the direction of arrow 84 (FIGS. 8a to 8d) by an indexing unit 37–40 shown in FIG. 4.

Figure 6:
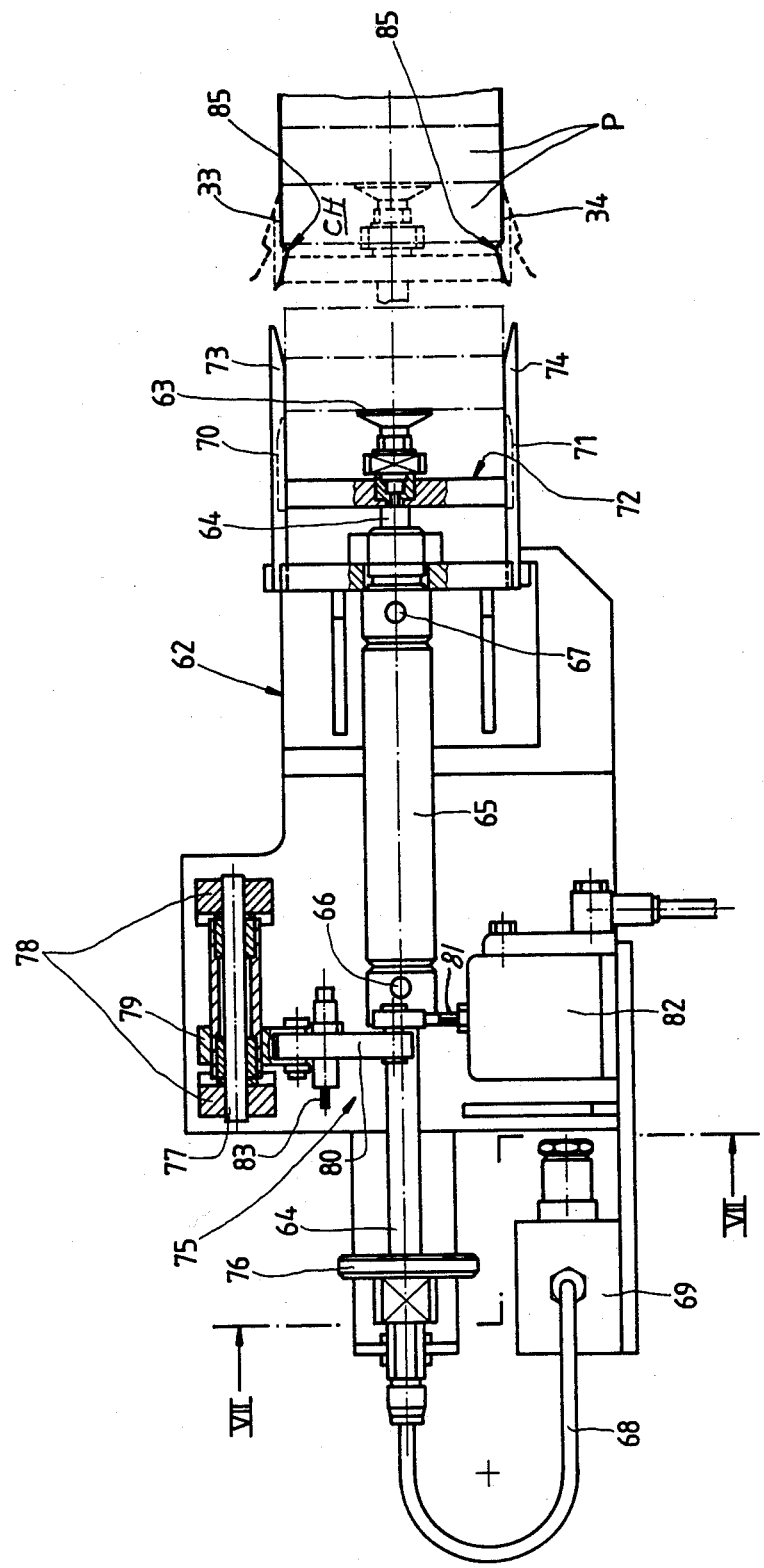
FIG. 6 is an enlarged partially plan and partially substantially horizontal sectional view of the means for accumulating removed satisfactory objects into spare stacks, substantially as seen in the direction of arrow VI in FIG. 3.

The illustrated conveyor 27 has three pockets 30, 31 and 32 which are equidistant from each other in the circumferential direction of the conveyor and each of which is dimensioned to receive a stack S or ES of two superimposed packs P. The pockets 30 to 32 rre indexible between the stationary sidewalls 28, 29 and each of these pockets has two resilient walls 33, 34 (see particularly the right-hand portion of FIG. 6) movable toward and away from each other to respectively engage or release a single pack P or a stack S or ES of packs in the chamber CH of the respective pocket. The chamber CH is disposed between the walls 33, 34 which tend to assume the solid-line positions of FIG. 6 but can be pivoted or flexed apart by a moving means 72 which will be described later. Each of the walls 33, 34 has a noselike projection 85 which can overlie the exposed surface of the outer pack of two overlapping packs in the respective chamber CH. The projections 85 share the movements of the respective walls 33, 34 so that they automatically release the pack or packs in the respective chamber CH when the pack or packs are to be expelled and to permit insertion of one or two packs into the respective chamber CH. Each of the walls 33, 34 can be made of resilient metallic sheet stock or of elastomeric plastic material.

The openings 36 in the fixed sidewalls 28, 29 flank a predetermined portion 35 of the path for the stream of stacks S on the platform 10, namely a portion of the path which is located at a selected distance from the opening 11 for the elevator 8 (as seen in the direction of the arrow 7). When the pocket 30, 31 or 32 is located in register with the openings 36 of the sidewalls 28, 29, the conveyor 27 can be said to form part of the means for transporting the stacks S in the direction of arrow 7; at the very least, the conveyor 27 does not interfere with stepwise transport of the stream whenever the chamber CH of one of its pockets 30, 31 and 32 is in line with the openings 36. The dimensions of each chamber CH are selected in such a way that it can accommodate two superimposed packs P, and such packs are normally held by the walls 33, 34 of the respective pocket.

The means for indexing the conveyor 27 relative to the sidewalls 28, 29 through angles of 120° comprises a prime mover 37 (e.g., a so-called disc armature stepping motor), a first toothed pulley 38 on the output element of the prime mover 37, a second toothed pulley 39 on the horizontal shaft of the conveyor 27, and a toothed belt 40 which is trained over the pulleys 38, 39. The arrangement is such that each of the pockets 30, 31 and 32 is indexible between a first position at 35 (in which its chamber CH is in line with the openings 36 of the sidewalls 28, 29, i.e., in which such chamber occupies a portion of the elongated path for the stream of stacks S on the platform 10), a second position 41 in which the respective chamber CH is adajcent two expelling members in the form of pushers 48, 49 normally disposed at opposite sides of the path of movement of the conveyor 27, and a third position 42 in which the respective chamber CH is adjacent a pneumatic holder 63 in the form of one or more suction cups serving to temporarily hold and store satisfactory packs PG and to move such packs relative to the adjacent pocket 30, 31 and 32. the positions 35, 41 and 42 of the pockets 30-32 are shown in FIGS. 3 and 8a to 8d. The mutual spacing of positions 35, 41, 42 (as seen in the circumferential direction of the conveyor 27) is 120°. The pushers 48, 49 form part of an expelling mechanism or ejector 43 which is installed in the apparatus adjacent that pocket which occupies the position 41. The pusher 48 is designed to eject or expel a defective pack PF from the inner portion of the adjacent chamber CH, and the pusher 49 is designed to eject or expel a defective pack PF from the outer portion of such chamber. The sidewall 28 has a second opening 44 which is large enough to permit expulsion of a defective pack PF from the inner portion of the adjacent chamber CH, and the sidewall 29 has a similarly dimensioned second opening 45 for expulsion of a defective pack PF from the outer portion of the adjacent chamber CH.

Figure 5:
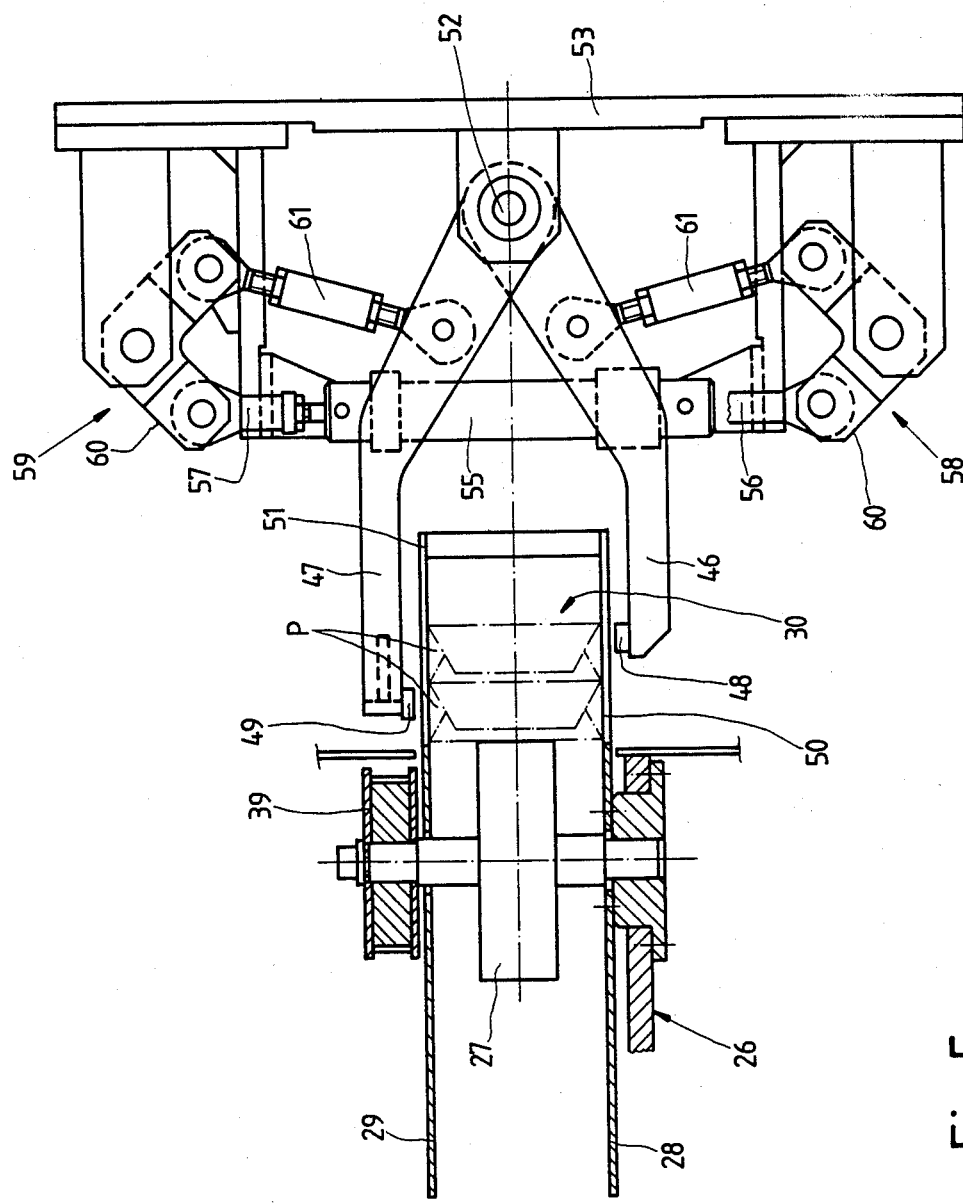
FIG. 5 is an enlarged view of the expelling means as seen in the direction of arrow V in FIG. 3, a portion of the indexible conveyor and the sidewalls which flank the conveyor being shown in section.

The means for moving the pushers 48, 49 relative to the adjacent pocket 30, 31 or 32 of the conveyor 27 comprises two levers 46, 47 (see particularly FIG. 5) which are pivotable about the axis of a fixed fulcrum 52 in a support 53 of the mechanism 43. The sidwalls 28, 29 are respectively provided with suitable cutouts in the form of slots 50 and 51 for the levers 48, 49, respectively. The means for pivoting the leveres 46, 47 comprises discrete fluid-operated motors 54, 55 (e.g., double-acting acting pneumatic cylinder and piston units) which are mounted on the support 53 and whose output elements (piston rods) 56, 57 transmit motion to the respective levers 46, 47 by way of discrete transmissions in the form of linkages 58, 59. Each of these transmissions includes a bell crank lever 60 which is pivotable in the support 53 and one arm of which is articulately connected with the respective output element 56, 57. The other arm of each of the bell crank levers 60 is articulately connected with a rod-like connecting member 61 (whose effective length is preferably variable), and each member 61 is further articulately connected with the respective lever 46 or 47. The illustrated transmissions 58 and 59 enable the respective output elements 56, 57 to perform single (inward or outward) strokes in order to effect a pivotal movement of the respective levers 46, 47 in a clockwise as well as in a counterclockwise direction, i.e., to enable the respective pushers 48, 49 to expel defective packs PF from the correspnding portions of a chamber CH in the position 41 as well as to thereupon leave such chamber in order to allow for renewed indexing of the conveyor 27.

The aforementioned holder 63 forms part of a means 62 (FIG. 6) for mechanically (automatically) accumulating satisfactory packs PG into spare stacks ES which are ready for reintroduction into the path for the stream of stacks S on the platform 10, i.e., which are ready to fill gaps G that develop as a result of removal of defective stacks S by the pockets 30-32 of the conveyor 27. The accumulating means 62 is adjacent that pocket of the conveyor 27 which occupies the position 42. This accumulating means further comprises means for moving the holder 63 substantially radially of the conveyor 27 into and out of the chamber CH in the position 42. The means for moving (reciprocating) the holder 63 comprises a fluid-operated motor 65 in the form of a double-acting pneumatic cylinder and piston unit whose piston rod 64 carries the holder 63. The piston in the cylinder of the motor 65 in reciprocable between two ports 66, 67 which are connected or connectable with a source of compressed air (not shown) by way of suitable valve means so as to move the holder 63 toward and into or out of a chamber CH in the position 42.

The piston rod 64 of the motor 65 is hollow and one of its end portions is connected with a suction generating device 69 by way of a flexible conduit 68. The device 69 can draw air through one or more orifices of the holder 63 so that the latter can attract and hold a satisfactory pack PG which has been delivered by a chamber CH in response to indexing of the respective pocket 30, 31 or 32 from the position 41 to the position 42.

The aforementioned means for moving the walls 33, 34 of the pockets 30-32 apart is mounted on the piston rod 64 for the holder 63 and includes a bifurcated member 72 having two prongs 70, 71 with wedge-like end portions which can enter between the adjacent walls 33, 34 when the corresponding pocket 30, 31 or 32 occupies the position 42 whereby the projections 85 of the walls 33, 34 are moved apart and enable the holder 63 to extract a satisfactory pack PG from the adjacent chamber CH or to insert a satisfactory pack PG into such chamber.

The apparatus further comprises two guide members 73, 74 which flank the path of reciprocatory movement of the holder 63 toward and out of the adjacent chamber CH in order to ensure that the pack PG which shares the movement of the holder 63 is maintained in an optimum orientation for entry into a chamber CH or for temporary storage on the holder 63 preparatory to introduction into the chamber CH of an oncoming pocket 30, 31 or 32.

The apparatus further comprises means 75 for limiting (shortening) the strokes of the holder 63 under the action of the hollow piston rod 64. The arrangement is such that the means 75 can shorten the stroke of the holder 63 by the thickness of a pack P. The stroke limiting means 75 comprises a first abutment or stop 76 in the form of a disc or wheel which is mounted on the piston rod 64 between the cylinder of the motor 65 and the flexible conduit 68 and a second stop 83 on one arm of a bell crank lever 79 (see particularly FIG. 7) which is pivotable about the axis of a stationary shaft 77 in a bracket 78 forming part of or secured to the frame of the improved apparatus. The other arm of the bell crank lever 79 is articulately connected with one end of a link 80 the other end of which is articulately connected with the piston rod or push rod 81 of an actuator 82. The stop 83 is preferably mounted on the lever 79 with the interposition of one or more damper springs or other cushioning means to cushion the impact of the mobile stop 76 upon the stop 83 when the actuator 82 is caused to move the stop 83 into the path of movement of the stop 76.

The mode of operation of the apparatus will be expalined with reference to FIGS. 1, 3 and 8a to 8d. One of the chambers CH is in register with the openings 36 of the stationary sidewalls 28, 29 when the conveyor 27 is idle so that such chamber defines a portion of the path for stacks S and permits satisfactory stacks S (i.e., each stack which consists of two overlapping satisfactory packs PG) to pass therethrough on its way toward the next processing machine, such as the aforementioned case packer or carton filler). In other words, the chamber CH which occupies the postion 35 does not interfere with the transport of stacks S along the platform 10 under the action of pushers 9 which are moved by the carrier 12 in the aforedescribed manner.

As mentioned above, each of the four stacks S upstream of the openings 36 in the sidewalls 28, 29 contains a defective pack (1F, 3F, 6F, PF). As shown in FIG. 1, the defective pack 1F of the foremost defective stack S (immediately adjacent the opening 36 of the sidewall 29) is located on top of the satisfactory pack 2G. These packs are caused to enter the chamber CH of the pocket 30 in response to the next stepwise advance of the pushers 9 in response to movement of the carrier 12 under the action of the planetary transmissions 13, 14. As explained above, signals which identify defective packs (including the pack 1F) are generated ahead of the apparatus and preferably ahead of the elevator 8 (e.g., in the wrapper machine which provides each pack with an outer wrapper of transparent or translucent plastic sheet material), and such signals are used to start the prime mover 37 of the indexing means 37–40 in order to index the conveyor 27 by 120° (in the direction of arrow 84) as soon as the stack S including the packs 1F, 2G enters the chamber CH of the pocket 30. This results in a movement of the position 35 (shown at the top of FIG. 3) to the position 41 (shown at the four o'clock position of the conveyor 27 in FIG. 8aa). The motor 54 of the ejector mechanism 43 is then started to move the pusher 48 into the adjacent chamber CH of the pocket 30 so as to expel the defective pack 1F by way of the opening 45 in the sidewall 29. The lever 46 for the pusher 48 is capable of moving the pusher 48 in the just described manner because the sidewall 28 is formed with the aforementioned slot 50.

At the same time, the pushers 9 advance the stream of stacks S by a step along the platform 10 in the direction of the arrow 7 so that the stack S including the packs 3F, 4G enters the chamber CH of the pocket 31 (this is shown at the top of FIG. 8a) which then occupies the position 35 so that its chamber CH forms part of the path for the stream of stacks on the platform 10.

When the expulsion of the defective stack 1F from the chamber CH of the pocket 30 in the position 41 is completed, the prime mover 37 is caused to index the conveyor 27 again through an angle of 120° (in the direction of arrow 84) so that the pocket 30 reaches the position 42, the pocket 31 reaches the position 41 and the pocket 32 reaches the position 35 (FIG. 8b). Thus, the satisfactory pack 2G in the chamber CH of the pocket 30 is then adjacent the holder 63 of the accumulating means 62. The packs 3F, 4G are located next to the pushers 48, 49 of the expelling unit 43, and the motor 54 again receives a signal to pivot the lever 46 for the pusher 48 so that the latter performs a forward and a return movement and expels the defective pack 3F from the chamber CH of the pocket 31 in the same manner as described above in connection with the defective pack 1F. At the same time, the transmissions 13, 14 cause the carrier 12 to advance the pushers 9 by a step in the direction of the arrow 7 so that the stack S including the packs 5G, 6F enters the chamber CH of the pocket 32 which then occupies the position 35. Furthermore, the holder 63 is caused to enter the chamber CH of the pocket 31 in the position 42 and to extract therefrom the satisfactory pack 2G. At such time, the second stop 83 is held in the retracted position so that it does not interfere with the movement of the piston rod 64 and the stop 76 thereupon toward the position 42. The orifice or orifices of the holder 63 are connected with the suction generating device 69 while the holder 63 thereon extracts the satisfactory pack 2G from the chamber CH of the pocket 30 in the position 42. The prongs 70, 71 of the moving means 72 spread the walls 33, 34 of the pocket 30 apart so that the projections 85 and the walls 33, 34 do not interfere with evacuation of the pack 2G from the chamber CH of the pocket 30. The guide members 73, 74 ensure that the orientation of the satisfactory stack 2G does not change during movement of such pack out of the pocket 30 to a position for temporary storage adjacent the path of movement of pockets 30–32 about the axis of the conveyor 27. As the holder 63 is retracted, the resilient walls 33, 34 of the pocket 30 are permitted to move back toward each other so that they come to a halt at a preselected distance from each other as a result of abutment against the hub of the conveyor 27.

The conveyor 27 is thereupon again indexed through 120° so that its pockets 30–32 assume the positions which are shown in FIG. 8c. The stream of stacks S on the platform 10 also advances by a step so that the packs PG, PF of the fourth stack S are located between the openings 36 of the sidewalls 28, 29. It goes without saying that one or more stacks S can contain only defective packs PF or only satisfactory packs PG. The difference is that the conveyor 27 is not indexed at all if the stack S between the sidewalls 28, 29 does not contain any defective packs. If both packs of the stack S between the sidewalls 28, 29 are defective, the conveyor 27 is indexed in the same way as described above except that the pushers 48, 49 are then actuated simultaneously as soon as such stack reaches the position 41.

Since the pack 5G is located outwardly of the pack 6F, the advancement of the stack including the packs 6F, 5G to the position 41 results in actuation of the pusher 49 via lever 47 so that the pack 6F is expelled from the inner portion of the respective chamber CH (pocket 32) in a direction toward the observer of FIG. 8c. At the same time, the holder 63 delivers the satisfactory pack 2G into the chamber CH of the pocket 31 in the position 42 so that the pocket 31 then contains a spare stack ES of two satisfactory packs 2G and 4G. The connection between the orifice or orifices of the holder 63 and the suction generating device 69 is interrupted as soon as the satisfactory pack 2G reaches the satisfactory pack 4G in the chamber CH of the pocket 31 so that the holder 63 can be extracted from the pocket 31 without the pack 2G. The stop 83 is moved into the path of the stop 76 while the holder 63 and the satisfactory pack 2G advance into the chamber CH of the pocket 31 so that the stroke of the holder 63 is shortened by the thickness of a pack and the holder 63 comes to a halt when the front side of the pack 2G reaches the adjacent side of the pack 4G in the pocket 31. This results in gentle deposition of the pack 2G without any deformation any/or other damage to the packs 2G, 4G.

The conveyor 27 is then indexed again so that the spare stack ES in the chamber CH of the pocket 31 assumes the position of FIG. 8d in which the spare stack is located in one of the gaps G in the stream of stacks S on the platform 10. The pushers 9 ensure that the gaps G preceding the gap which is filled by the stack including the packs 2G, 4G remain intact, i.e., their widths (as seen in the direction of arrow 7) remain unchanged and are caused to disappear downstream of the sidewalls 28, 29 by moving the trailing stacks (each of which contains only satisfactory packs) forwardly relative to the preceding stacks.

The satisfactory pack 5G which has reached the position 42 (see FIG. 8d) is extracted by the holder 63 and is held in a position of readiness outside of the pockets 30–32 for insertion into the chamber of an oncoming pocket, e.g., into the chamber of a pocket which already contains a satisfactory pack (namely the pocket containing the pack PG) so that the satisfactory pack PG in such pocket and the pack 5G jointly form a further spare stack ES which is ready for introduction into a gap G above the platform 10.

An important advantage of the improved method and apparatus is that the operation can be automated to any desired extent as well as that at least some of the gaps G in the stream of stacks S can be filled exclusively with spare stacks ES which contain retrieved satisfactory packs (such as 2G, 4G, 5G and PG).

The conveyor 27 can be provided with a larger number of pockets. It has been found that a conveyor with three equidistant pockets is quite satisfactory because it can place a discrete pocket at each of the three positions 35, 41 and 42 in response to each indexing of the conveyor by the indexing means 37–40.

The manner in which the ejected defective packs (including those shown at 1F, 3F, 6F and PF) are processed to recover their contents forms no part of the invention. If desired, all of the defective packs can be expelled at one and the same side of the conveyor 27.

It is further within the purview of the invention to separate the means 72 for moving the walls 33, 34 of the pockets 30, 31 and 32 from the means 62 which includes the holder 63. The illustrated construction is preferred at this time because it saves space and automatically ensures that the holder 63 can insert or withdraw satisfactory packs into and from the adjacent chamber CH.

The means for transporting the stream of stacks S along the platform 10 can be modified in a number of ways without departing from the spirit of the invention. The illustrated transporting means is preferred at this time because it ensures that successive stacks S invariably enter the space between the sidewalls 28, 29 as well as that the packs which form the stacks S are advanced stepwise without deformation and/or other damage. Still further, the pushers 9 ensure that the width of the gaps G remains unchanged so as to guarantee that a gap between the sidewalls 28, 29 can be reliably filled with a spare stack ES.

The improved method and apparatus ensure the reusing of each and every satisfactory pack which was expelled from the stream on the platform 10 and thus reduces at least in half the number of rejects which cannot be reused in the apparatus. All satisfactory packs which are removed from the stream are treated gently so that their contents and their envelopes remain intact and warrant reintroduction into the stream on the platform 10 without any further inspection.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of replacing defective cigarette packs or like objects with satisfactory objects, comprising the steps of forming and transporting a multi-layer stream of neighboring stacks of overlapping objects; removing from the stream each stack which contains defective objects as well as defective and satisfactory objects whereby the removal of stacks results in the development of gaps in the stream; accumulating the removed satisfactory objects into spare stacks; and returning the objects which constitute spare stacks into the stream to fill at least some of said gaps.

2. The method of claim 1, wherein said accumulating step includes mechanically gathering removed satisfactory objects into spare stacks.

3. The method of claim 1, further comprising the step of segregating defective objects from satisfactory objects of the removed stacks containing satisfactory and defective objects.

4. The method of claim 3, wherein said segregating step includes expelling defective objects from stacks which contain satisfactory and defective objects.

5. The method of claim 1, wherein said accumulating step includes piling removed satisfactory stacks on top of each other until the thus obtained pile constitutes a spare stack.

6. The method of claim 1, further comprising the step of temporarily storing at least some satisfactory objects which are removed from the stream.

7. The method of claim 1, wherein each stack consists of two superimposed objects.

8. The method of claim 1, wherein said transporting step comprises transporting the stream along an elongated substantially straight path, said removing step including moving the stacks containing defective objects from a predetermined portion of said path substantially at right angles to said path.

9. The method of claim 8, wherein said path is substantially horizontal and said removing step includes advancing each removed stack in a substantially vertical plane.

10. The method of claim 9, wherein said accumulating step includes gathering removed satisfactory objects in a predetermined portion of said plane and said returning step includes moving the gathered satisfactory objects from said predetermined portion of said plane back into said predetermined portion of said path.

11. The method of claim 8, further comprising the steps of monitoring the objects of successive stacks of said stream ahead of said path, generating signals denoting the detection of defective objects, and utilizing said signals for removal of stacks containing defective objects from said predetermined portion of said path.

12. Apparatus for replacing defective cigarette packs, or like objects with satisfactory objects in a multi-layer stream of neighboring stacks of overlapping objects wherein randomly distributed stacks contain satisfactory and defective objects, comprising means for transporting the stream of objects along a predetermined path; and conveyor means including means for removing stacks containing defective as well as satisfactory and defective objects from said path with the resulting development of gaps in the stream, means for gathering removed satisfactory objects into spare stacks, and means for admitting gathered spare stacks into said path.

13. The apparatus of claim 12, wherein said gathering means includes means for mechanically accumulating removed satisfactory objects into spare stacks.

14. The apparatus of claim 12, wherein said transporting means includes means for advancing the stream in a predetermined direction and said conveyor means includes a conveyor which is rotatable about a predetermined axis in a plane extending substantially at right angles to said direction, and means for rotating said conveyor.

15. The apparatus of claim 14, wherein said removing-admitting means includes pockets provided in said conveyor, each of said pockets being arranged to receive a stack containing at least one defective object or a spare stack of satisfactory objects.

16. The apparatus of claim 15, wherein said rotating means comprises means for indexing said conveyor about said axis between a plurality of positions in each of which a different pocket is located in a predetermined portion of said path.

17. The apparatus of claim 16, further comprising means for expelling defective objects from a first pocket of said conveyor while a second pocket of the conveyor is located in said predetermined portion of said path.

18. The apparatus of claim 16, further comprising means for storing satisfactory objects for admission into a first pocket while a second pocket of said conveyor is located in said predetermined portion of said path.

19. The apparatus of claim 16, wherein said conveyor comprises more than two pockets and further comprising means for expelling defective objects from a first pocket of said conveyor while a second pocket is located in said predetermined portion of said path, and means for storing satisfactory objects for admission into a third pocket while the second pocket is located in said predetermined portion of said path and the expelling means expels one or more objects from the first pocket.

20. The apparatus of claim 16, wherein said conveyor has three equidistantly spaced pockets and said indexing means includes means for indexing said conveyor through angles of 120°.

21. The apparatus of claim 16, further comprising means for expelling defective objects from a first pocket of said conveyor while a second pocket of the conveyor is located in said predetermined portion of said path, said conveyor being indexible along a second path and said expelling means being adjacent a predetermined portion of said second path.

22. The apparatus of claim 16, further comprising means for storing satisfactory objects for admission into a first pocket of said conveyor while a second pocket of said conveyor is located in said predetermined portion of said path, said storing means including means for removing satisfactory objects from and for introducing satisfactory objects into the pockets of said conveyor.

23. The apparatus of claim 15, wherein each of said pockets is dimensioned to receive a pair of stacked objects.

24. The apparatus of claim 15, wherein each of said pockets has first and second walls and a chamber for stacks of objects between the walls, at least one of said walls being movable toward and away from the other of said walls to respectively engage and release an object or a stack in the respective chamber.

25. The apparatus of claim 24, wherein at least said first wall has a projection arranged to overlie an object in the respective chamber while said one wall engages an object or a stack in the chamber.

26. The apparatus of claim 15, wherein said conveyor includes a rotor which is rotatable about said axis and said apparatus further comprising two sidewalls flanking said rotor, said rotor being indexible between a plurality of positions in each of which one of said pockets is located in a predetermined portion of said path and another of said pockets is remote from said path, said sidewalls having first openings located in said path so that successive stacks of the stream can enter and leave said predetermined portion of said path by entering such predetermined portion by way of the opening in one of said sidewalls and by leaving the predetermined portion of said path by way of the opening in the other of said sidewalls, at least one of said sidewalls further having a second opening which registers with the other pocket of said conveyor while the one pocket is located in said predetermined portion of said path, and further comprising means for expelling defective objects from the other pocket by way of said second opening.

27. The apparatus of claim 15, wherein said rotating means comprises means for indexing said conveyor about said axis between a plurality of positions in each of which a different pocket is located in a predetermined portion of said path, and further comprising means for expelling defective objects from a first pocket while a second pocket of the conveyor is located in said predetermined portion of said path, said expelling means including first and second pushers disposed at opposite sides of said conveyor and means for moving said pushers into a first pocket.

28. The apparatus of claim 27, wherein said means for moving said pushers includes first and second pivotable levers operatively connected with the respective pushers and means for pivoting said levers.

29. The apparatus of claim 28, wherein said pivoting means comprises first and second motors each having a reciprocable output element arranged to perform a forward and return stroke and first and second transmissions interposed between the output elements of said first and second motors and the respective levers, each of said transmissions having means for converting one stroke of the respective output element into clockwise and clockwise pivotal movements of the respective lever.

30. The apparatus of claim 15, wherein said rotating means comprises means for indexing said conveyor about said axis between a plurality of positions in each of which a different pocket is located in a predetermined portion of said path, and further comprising means for storing satisfactory objects for admission into a first pocket while a second pocket of said conveyor is located in said predetermined portion of said path, said storing means comprising a suction-operated holder for objects.

31. The apparatus of claim 30, further comprising means for moving said holder with reference to said conveyor.

32. The apparatus of claim 31 wherein each of said pockets has first and second walls and a chamber for stacks of objects between said walls, at least one of said walls being movable toward and away from the other of said walls to respectively engage and release an object or a stack in the respective chamber, said means for moving said holder with reference to said conveyor comprising means for moving said one wall away from said other wall.

33. The apparatus of claim 31, wherein said moving means is arranged to move the holder along a second predetermined path and further comprising guide means for objects, said guide means flanking said second predetermined path.

34. The apparatus of claim 31, wherein said moving means includes means for reciprocating said holder along a second predetermined path and means for selectively limiting the strokes of said holder in said second path.

35. The apparatus of claim 34 for replacing defective objects with satisfactory objects having predetermined thicknesses, wherein said limiting means includes means for limiting the strokes of said holder by the thickness of an object.

36. The apparatus of claim 12, wherein said path is elongated and said transporting means includes pushers for the stacks in said path and means for moving said pushers transversely of said path as well as in the longitudinal direction of said path.

37. The apparatus of claim 36, wherein said means for moving the pushers comprises a carrier for pushers and two planetary transmissions having eccentrics supporting spaced-apart portions of said carrier.

38. The apparatus of claim 37, wherein said pushers define a row of compartments for discrete stacks of objects.

* * * * *